United States Patent [19]

Tucker

[11] Patent Number: 4,478,582

[45] Date of Patent: Oct. 23, 1984

[54] LANGUAGE SYNTAX EDUCATIONAL SYSTEM

[76] Inventor: Ruth L. Tucker, 1130 Pacific Beach Dr., San Diego, Calif. 92109

[21] Appl. No.: 429,963

[22] Filed: Sep. 30, 1982

[51] Int. Cl.³ .............................................. G09B 1/34
[52] U.S. Cl. .................................... 434/170; 434/172
[58] Field of Search ....................... 434/170, 171, 172

[56] References Cited

U.S. PATENT DOCUMENTS 3,235,976 2/1966 Elliott et al. ........................ 434/170
3,389,480 6/1968 Holland .......................... 434/170 X

FOREIGN PATENT DOCUMENTS 1521793 3/1968 France ............................... 434/170

*Primary Examiner*—William H. Grieb

*Attorney, Agent, or Firm*—Thomas J. Tighe

[57] ABSTRACT

An educational system for teaching and learning English grammar and syntax comprising a plurality of sets of individually manipulable members, preferably cards, each representing a word. Each set comprises a plurality of identical members and the members from each set are distinguishable with respect to their color and shape taken together from the members of every other set. The color of each member is informative to the student of the use of the member in a sentence. The shape of each member is informative to the student of the type of word that the member represents. Each member either has a word imprinted upon it or is adaptable to receiving indicia. The user combines members to construct sentences. Preferably, the members are cards which are part of an educational kit.

20 Claims, 3 Drawing Figures

FIG. 3

LANGUAGE SYNTAX EDUCATIONAL SYSTEM

BACKGROUND OF THE INVENTION

This invention is related to educational apparatuses and methods for teaching and learning grammar and syntax.

The system presented in this specification was created and designed to facilitate the learning and understanding of the correct usage of the English language. It is designed to provide multisensory inputs. It assists the user in the comprehension of language (auditory and visual) and in the composition of language (vocal and written). Grammar and syntax are generally assessed by students as unfathomable, unusable, and unconquerable. Most students reluctantly, without recourse, struggle to pass through these school required courses with the least injury. They are not aware as are the erudite that mastery of language leads to the control and creation of one's own mental activity. The health of a democracy is in the competency of its citizens. We are now aware through the media that the public and public officials agree in the urgency to reverse the condition of language incompetency to language competency.

We think and understand in language. Meaning is an abstract word and refers to a variety of different issues. Meaningfulness of content is influenced by the learner's familiarity with the material. Meaning is influenced by whether the content can be placed in a larger meaningful context. Meaning is influenced by whether there is ability to move from whole to part and from part to whole of the content. Meaning is influenced by whether the learner is interested and believes that his/her efforts and acquisition are possible and worthwhile.

Desirable learning systems organize the material and relate the component parts to each other and to the familiar. At any and every step of inspection, familiarity with the whole gives significance to the component parts. This invention adds mnemonic significance to the specific choice of the colors- red, white, and blue, relating English grammar and syntax (the unknown) to the colors of the American Flag (the highly associated known). Further, the fixed serial ordering of the flag's colors, red, white, blue, provide serial imprinting for the development of the syntax of the sentence. Further, the use of shape mediates information that large shapes cue foundation words (noun, pronoun, verb, coordinate conjunction) and that small shapes cue modifications of the noun, pronoun, and verb foundation words. Further, the use of color mediates the parts of speech and the case of nouns and pronouns. Thus, the components of the system serve to reinforce each other, and, all serve to reinforce the oneness of the flag-language-syntax association.

The invention is highly semantically cognitive, visual, auditory and manipulable. As such, it provides a multisensory learning system: visual, auditory, tactile, and kinesthetic. Goals are to assist the user in the comprehension of language (auditory and visual) and in the composition of language (vocal and written), etc. The invention is adaptable for use in grades 1 through adult level. Decoding and encoding language skills are increased by the use of mnemonic color and shape coded parts of speech cards.

Heretofore, educational systems and devices have been presented which utilize cards, placards, and other objects which represent words. Furthermore, there have been systems which presented some element of color and color relationships. U.S. Pat. No. 3,389,480 by L. V. Holland presents a game and teaching method which uses color coded cards in teaching the parts in speech. That method, however, uses uniformly shaped cards. Therefore, the shape coding is not present. Furthermore, the case of nouns and pronouns is not discriminated; action and linking verbs are not distinguished; relative pronouns and subordinate conjunctions are not distinguished; and infinitives are not mentioned. U.S. Pat. No. 3,325,976 by S. S. Elliott et. al., presents an educational apparatus which uses color coded cards or blocks representing words. However, as in the previously mentioned patent, the blocks or cards are not shape coded, that is, the shape of the members bears no information for the user. Furthermore, the specifically selected colors for the coding are not intrinsically purposeful. S. S. Elliott et.al. note that "the specific colors involved are of no moment as long as there is a certain correspondence . . . any other color may be used, as long as a correspondence exists." It should also be noted that the color coding is not comprehensive and that the possessive case of nouns and pronouns is omitted.

Additionally, S. S. Elliott et.al. supply four shades of one color for the nominative case and three shades of one color for the objective case. The present invention provides a more efficient one-to-one relationship between color and nominative and objective cases. In this invention there is a bonus for children who are beginning to read in grades one through three in that the red-white-blue sequence trains left to right awareness which very often is difficult for beginning readers.

This invention adds significance to the specific colors coded. It discriminates a step further in combining color coding with shape coding which in turn increases the sensory input thereby increasing processing efficiency by relieving the memory and association systems of more complex interrelationships. It will be evident that the American flag sequence of the color coding is uniquely significant and thus uniquely advantageous to the user. Other attributes and advantages of this invention will be readily discernible upon the reading of the text hereinafter.

SUMMARY OF THE INVENTION

This invention presents an educational system for teaching and learning language grammar, particularly syntax, comprising a first set of individually manipulable members, each member bearing at least one foundation word of the language, and a second set of individually manipulable members being of a size noticeably distinguishable from the first set, each member of the second set bearing at least one non-foundation word of the language. The members of both sets are further divisible into a plurality of subsets such that each member of a subset is identical in color, shape and size to the other members of the same subset, the members of each subset being distinguishable from the members of other subsets by shape and color taken together. The color of each member is informative to the student of the use of the member in a sentence. The shape of each member is informative to the student of the type of word that the member represents. Each member either has a word imprinted upon it or is adaptable to receiving indicia. The user combines members to construct sentences. Preferably, the members are cards which are part of an educational kit. The kit further comprises a set of slides or filmstrips, audio tapes and an instructional book to be used in conjunction with the slides or filmstrips for use by the teacher or student. The kit further comprises a set of workbooks, a set of word bearing, self-adhesive labels for attaching to the cards, a means for holding the assorted cards, a legend to which the student can refer for reference, and a carrying case.

An object of this invention is to present an educational system which provides multisensory input to the student.

It is a further object of this invention to provide a means for synthesizing sentences from individual words by use of information derived from the color and shapes of the cards bearing the words.

Other objects of this invention will be apparent upon reading of the text hereinafter.

BRIEF DESCRIPTION OF THE DRAWINGS

Figure 3:
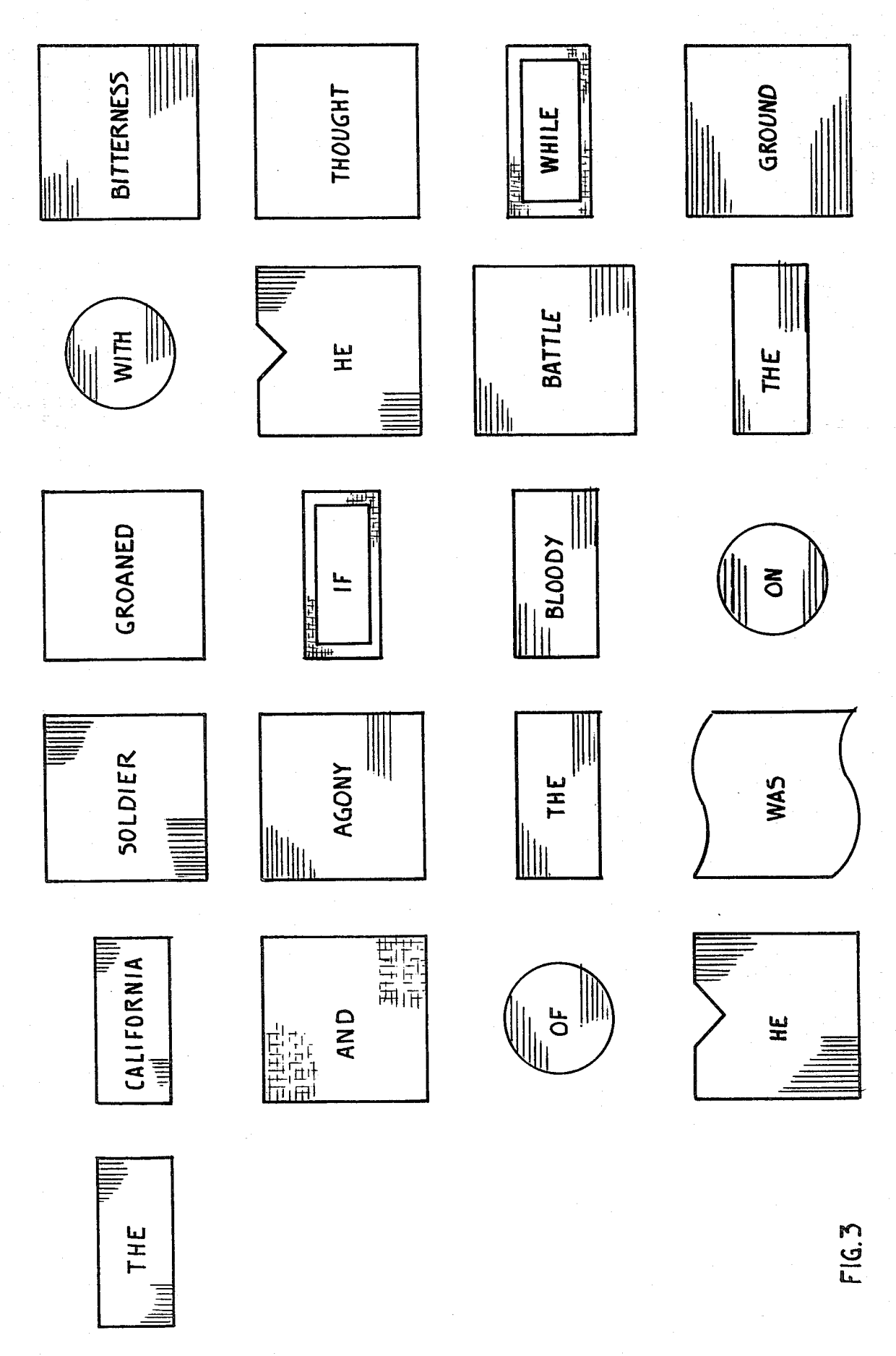

FIG. 3 is an example of sentence construction using this invention.

DESCRIPTION OF THE PREFERRED EMBODIMENT

Figure 1:
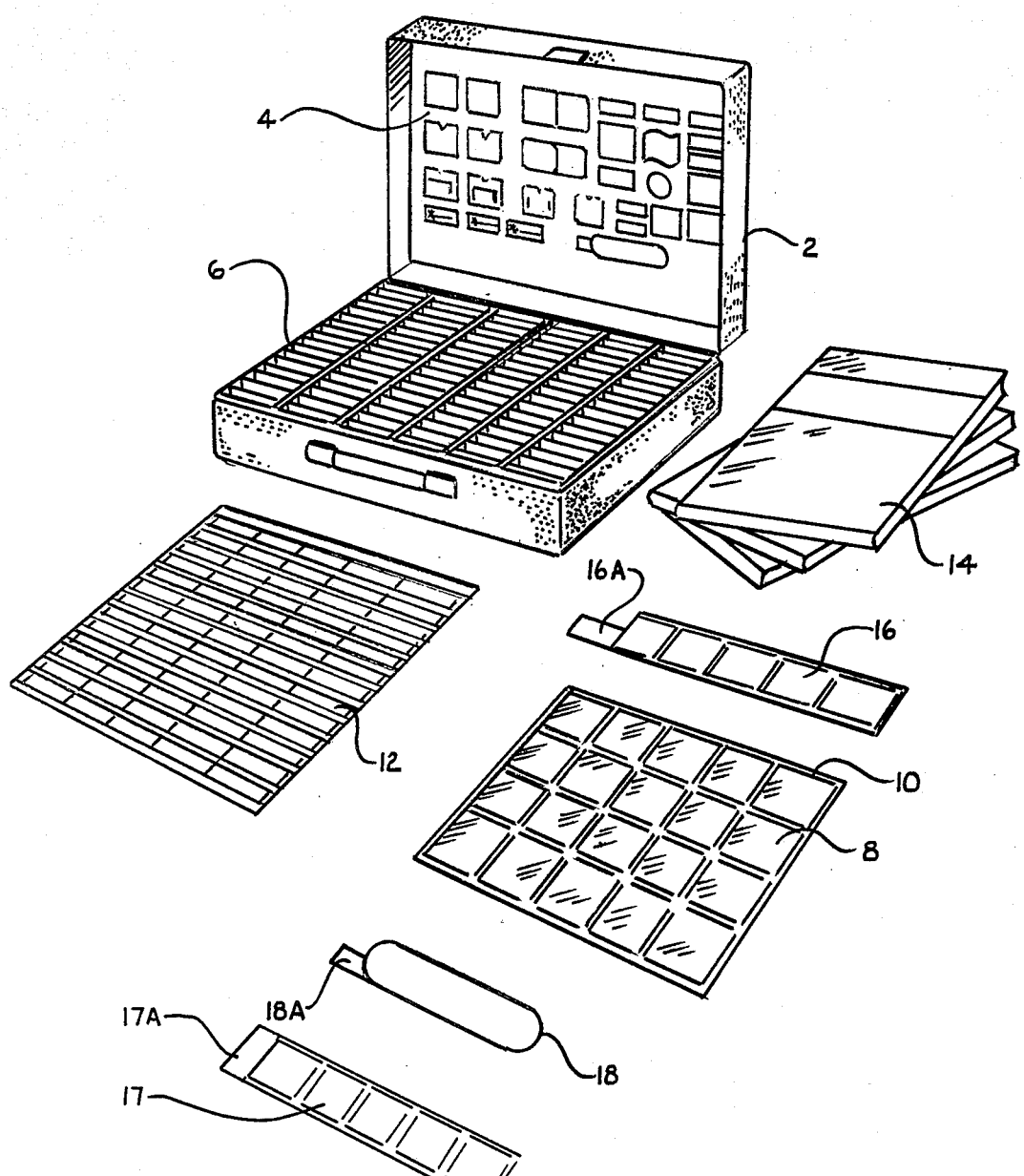
FIG. 1 is a perspective view of the educational system kit.

Referring to FIG. 1, a carrying case 2 is shown with a legend 4 affixed to the underside of the top cover of the carrying case. The legend 4 is provided as a quick reference for the teacher or student. The legend members will be defined in the succeeding paragraph. The bottom portion of the carrying case defines a plurality of slots 6 for transporting a plurality of film media such as slides or filmstrips or the like (not shown). The film media facilitate use of the system by the teacher and/or the learner. A teacher's student instructional book (not shown) is also included in the kit. The members are transported by means of a clear plastic sheet 8 with pockets 10 for storing the members. A pocketed sheet 8 can also be used as a convenient means of sequencing the order of the members when synthesizing a sentence. A sheet 12 of peel-off, self-adhesive labels is also provided in the kit. Each label bears a word and can be applied to a member. Thus, each member can be used for a single word or many words simply by manipulation of the labels adhering to the member. Each student can be given a workbook 14 which will assist him/her in understanding the system and utilizing the system. The workbooks will also contain instuctions and practice lessons for the students. An abbreviated member retainer 16 is shown with cue tab 16A. The abbreviated retainer is used for synthesizing subordinate clauses, and the cue tab 16A, as will be explained later, indicates that the clause is used as MOD III modifier. A specialized card 18 is shown with cue tab 18A. This specialized elliptical card is used to represent prepositional phrases, and the cue tab 18A, as will be explained later, indicates the prepositional phrase is used as a MOD II modifier.

Figure 2:
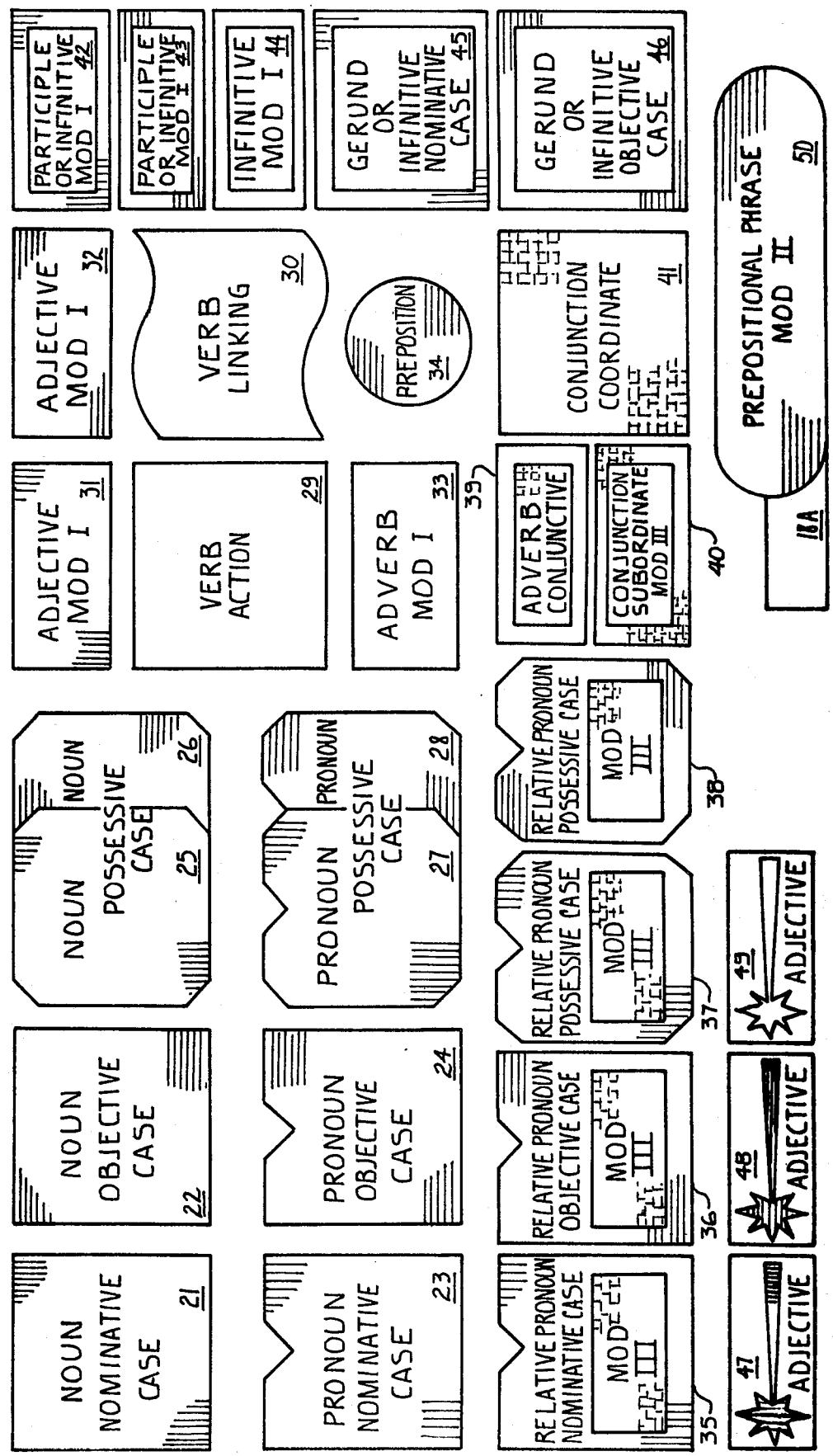
FIG. 2 is a depiction of each card-type used in this invention.

Referring to FIG. 2, each unique member is shown. Members 21, 22, 29, 41 45, and 46 are all of a first shape, preferably square. Members having substantially the same area as the first shape are foundation words, that is, they are used as the foundation structure of a sentence. Without foundation words, which are the building blocks of thought, there would not be a sentence. Members 23, 24, 35, and 36 are foundation words of a second shape, preferably a square with a top edge notched in the center. The second shape indicates that the members so shaped are pronouns. Member 30 is a third shape, preferably having straight vertical edges and S-shaped horizontal edges and having virtually the same area as the first shape. The third shape indicates that the members so shaped are linking verbs. Members 25, 26, 27, 28, 37 and 38 are of a shape which is an alteration of the first and second shapes, preferably beveled corners. First and second shapes having beveled corners indicate that the members so shaped are in the possessive case. Members 31, 32, 33, 42, 43, and 44 are of a fourth shape preferably rectangular and significantly reduced in area from the first, second and third shapes. The fourth shape indicates that the members so shaped are MOD I modifiers (adjectives, adverbs, participles, infinitives), that is, they are generally one-word modifiers, or, they are MOD III adverbial modifiers, that is, they are subordinate conjunctions which precede an adverbial clause which modifies. The fifth shape, preferably a circle, is represented in member 34. The fifth shape indicates that members so shaped are prepositions which introduce MOD II prepositional phrases which modify.

Referring again to FIG. 2, the discussion will now center on the color coding. Each sentence in the English language is composed of one or more independent clauses. A simple sentence contains only one independent clause. A compound sentence contains two or more independent clauses. A complex sentence contains one independent clause and one or more dependent clauses. A compound-complex sentence contains one or more independent clauses and one or more dependent clauses. Each clause contains a subject, predicate verb, and not always a subject or object complement. A first color, preferably red, indicates that the member so colored is either the subject (noun or pronoun) or refers back to the subject (predicate noun or predicate pronoun) or modifies the same (adjective). A second color, preferably white, indicates that a member so colored is a verb (action or linking) or modifies the same (adverb). A third color, preferably blue, indicates that a member so colored is an object (indirect, direct, or object of the preposition or modifies the same (adjective). A fourth color, preferably yellow, indicates that a member so colored is a conjunction (coordinate or subordinate). Words, phrases, and clauses are joined by conjunctions.

Referring to FIG. 2, the combination of shape information and color information inherent in each member will be explained as follows. Referring to member 21, it is square, and it is red. The square shape indicates that it is a foundation word, and the red color indicates that it is a noun in the nominative case. The red noun represents the subject or refers back to the subject as in the function of the predicate noun following the linking verb. Referring to member 22, it is square, and it is blue. The square shape indicates that it is a foundation word, and the blue color indicates that it is a noun in the objective case. The blue noun represents an object (indirect, direct, or object of the preposition). Similar reasoning applies to the use of members 23 and 24 with exception that their notched-shape indicates that they are pronouns rather than nouns. Referring to members 35 and 36, it can be seen that their coloring consists of a background of red and blue, respectively, with a small field of yellow. The fact they are large reveals they are foundation words; the notched-square indicates they are pronouns, and the application of yellow indicates they are performing the function of a conjunction. Members 35 and 36 perform a dual function represented by dual coloring. As such, members 35 and 36 are MOD III adjective modifiers, that is, they introduce a clause which modifies a noun or pronoun in the main clause while at the same time performing the dual function of a foundation word (relative pronoun).

Referring to members 45 and 46, it can be seen that their coloring consists of a field of white over a background of red and blue, respectively. The fact that they are large indicates that they perform the function of a foundation word. The white field indicates that they bear some relationship to a verb and the square shape with red and blue backgrounds indicate that they bear some relationship to the subject and object of the clause, respectively. Thus, the student would conclude that members 45 and 46 represent a form of a verb which acts as a noun and can be subject, predicate noun, or an object in the clause.

Member 40 consists of a background of yellow, indicating a conjunction function, with a field of white, indicating a verb related function. The reduced size reveals the information that it is a modifier and thus is being used as an adverb. The student would conclude that member 40 is acting as a conjunction and an adverb and is modifying the main clause verb; since it is acting as a conjunction it must introduce a clause, an adverbial clause. Thus member 40 is a MOD III modifier since it introduces an adverbial clause which modifies.

Members 25 and 26 are large and generally square, thus they are foundation words. They are red and blue, respectively, therefore they represent nouns, but the beveled corners reveal that they are nouns in the possessive case. Members 27 and 28 are, likewise, pronouns in the possessive case.

Members 29 and 30 are large and white indicating that they are foundation words and verbs. The square shape of 29 indicates it is an action verb and the horizontal "S" shape of 30 indicates that it is a linking verb.

Members 31 and 32 are of a reduced size and are red and blue, respectively. The reduced size indicates that they are modifiers and their coloring indicates that they modify a foundation word in the nominative and objective cases, respectively. The rectangular shape indicates that they do not introduce a prepositional phrase and therefore are not MOD II modifiers, and the fact that they have no yellow field upon them indicates that they do not serve a conjunctive function and therefore are not MOD III modifiers. Therefore, they are simply MOD I modifiers.

Member 33 is similarily a MOD I modifier but in this case it is an adverb since it is white and reduced in size.

Member 34 is reduced in size and circular in shape indicating that it is a preposition. The blue coloring indicates that it is always associated with the objective case, and the noun which is the object of the preposition.

Member 41 is large and yellow indicating that it is a foundation word which performs the function of a conjunction. The fact that it is square indicates that it is a coordinate conjunction which joins two (2) independent clauses.

Members 42, 43 and 44 are reduced in size indicating that they are modifiers. Members 42 and 43 have red and blue backgrounds, respectively, indicating that they modify a foundation word in the nominative and objective case, respectively, but they also have a white foreground indicating that they have some association with a verb word. The white foreground, therefore, informs the student that they represent participles or infinitives which modify nouns or pronouns. Since they do not perform any conjunctive function and do not introduce a prepositional phrase they are MOD I modifiers. By similar reasoning, it can be seen that member 44 is an infinitive which modifies a verb because of its white background.

Members 37 and 38 are large and generally square with a notched top edge. This informs the student that they are foundation words and are pronoun types. The beveled edges indicate that they are pronouns in the possessive case. The fact that they have a field of yellow upon them indicates that they serve some sort of a conjunctive function. These facts informs the student that they are MOD III modifiers because they introduce a clause which modifies a noun or a pronoun in the main clause while at the same time performing the function of a foundation word in the adjective subordinate clause.

Member 39 is reduced in size with a white background and a yellow foreground. The fact that it is reduced in size with a white background informs the student that it is a type of adverb. The yellow foreground indicates that it performs a conjunctive function. Thus the student would surmise that it is an conjunctive adverb.

Member 50 is a modification of member 34 in that it bears an entire prepositional phrase and is, therefore, a MOD II modifier. Cue tab 18A can either be red, white or blue depending on whether member 50 modifies a word in the nominative case, a verb, or a word in the objective case, respectively.

Members 47, 48 and 49 are magic wand teaching aids used by the teacher to indicate where an appropriate adjective or adverb should be inserted.

Referring again to FIG. 1, an abbreviated member retainer 17 is shown with a large cue tab 17A. The member retainer is used by the student to construct a clause and the large cue tab 17A indicates that the clause is, or should be a noun clause. A noun clause is a clause which can replace a noun or a pronoun, and the color of the cue tab 17A, red or blue, indicates whether the noun clause is the subject, relates to the subject or is an object in the main clause. It should be noted that noun clause cue tab 17A is larger than the cue tab 16A of the MOD III modifying clause and the cue tab 18A of the MOD II modifying clause because the noun clause does not modify; it actually replaces a foundation word.

The mnemonic significance of the colors (red, white, blue and yellow) is also utilized in the student's workbooks and film media. For example, the section of the workbook and film media which refers to the nominative case will have red pages and red film background, and sections and films dealing with verbs, the objective case, and conjunctions will have correspondingly colored pages and background.

From the foregoing, it can be seen that the shape of the members is informative of the type of word represented by the member and the color of each member is informative of the use of the member in a sentence.

The foregoing system is equally applicable to languages other than English. All communications in any language can be separated into discreet, complete thoughts analogous or identical to sentences, and each discreet thought is composed of foundation elements and modifiers i.e. non-foundation words. As used in the claims hereinafter, the term "sentence equivalent" is defined as such a complete, discreet thought.

I claim:

1. An educational system for teaching and learning language syntax comprising a plurality of sets of individually manipulable members, each set comprising a plurality of identical members, the members from each set being distinguishable with respect to their color and shape, taken together, from the members of every other set, the color of each member being informative of the use of the member in a sentence, the shape of each member being infomative of the type of word, each member being adapted to bear word indicia so that the user can use combinations of members to synthesize phrases and clauses, members bearing foundation words being noticeably larger than those which bear non-foundation words, members having a square shape being indicative of words in nominative case, words in the objective case, action verbs, or coordinate conjunctions, members having a square shape with a notched edge being indicative of pronouns, members having a horizontal "s" shape being indicative of linking verbs, members having a rectangular shape significantly reduced in area from the square, notched square, and horizontal "s" shapes being indicative of modifiers, members having a circular ended shape being indicative of prepositions, and members having beveled corners being indicative of words in the possessive case.

2. An educational system for teaching and learning language syntax comprising:
   (a) a first set of individually manipulable members, each member bearing at least one foundation word of the language,
   (b) a second set of individually manipulable members, being of a size noticeably distinguishable from the first set, each member of the second set bearing at least one non-foundation word of the language, the distinguishable size of the second set being informative that second set members are used as modifiers of first set members, both sets being adapted to have members combined to form a phrase and clause, and
   (c) the members of both sets being divisible into a plurality of subsets such that each member of a subset is identical in color, shape and size to other members of the same subset, each subset being distinguishable from other subsets by the shape and color, taken together, of its members, the color and shape of a member being informative of the type of word being borne by the member and of its use in the phrase or clause.

3. The system of claim 2 wherein the members are so colored that the color of each member is informative of the order in which the members are combined.

4. The system of claim 2 wherein all members bearing a noun, pronoun, verb, conjunction, relative pronoun, gerund, an infinitive to be used in the nominative case, and an infinitive to be used in the objective case are members of the first set, and wherein all members bearing an adjective, adverb, subordinate conjunction, conjunctive adverb, preposition, participle, and an infinitive to be used as a modifier are members of the second set.

5. The system of claim 3 wherein all members bearing a noun, pronoun, verb, conjunction, relative pronoun, gerund, an infinitive to be used in the objective case are members of the first set, and wherein all members bearing an adjective, adverb, subordinate conjunction, conjunctive adverb, preposition, participle, and an infinitive to be used as a modifier are members of the second set.

6. The system of claim 3 wherein the order of the members by coloring matches a suitably well known and commonly recited color sequence.

7. The system of claim 5 wherein the order of the members by coloring matches a suitably well known and commonly recited color sequence.

8. The system of claim 2 wherein the language is English.

9. The system of claim 4 wherein the language is English.

10. The system of claim 6 wherein the language is English.

11. The system of claim 6 wherein the color sequence comprises the colors of the national flag of the United States of America, and the order in which said colors are commonly recited, to wit: red, white and blue, and further comprising a fourth color being informative that the word on a member so colored is a conjunctive word.

12. The system of claim 7 wherein the color sequence comprises the colors of the national flag of the United States of America, and the order in which said colors are commonly recited, to wit: red, white and blue, and further comprising a fourth color being informative that the word on a member so colored is a conjunctive word.

13. The system of claim 11 wherein the color red is informative that a member so colored bears some relationship to the subject of a clause, wherein the color white is informative that a member so colored bears some relationship to an action verb or linking verb, and wherein the color blue is informative that a member so colored bears some relationship to an object in a phrase or clause.

14. The system of claim 12 wherein the color red is informative that a member so colored bears some relationship to the subject of a clause, wherein the color white is informative that a member so colored bears some relationship to an action verb or linking verb, and wherein the color blue is informative that a member so colored bears some relationship to an object in a phrase or clause.

15. The system of claim 3 wherein some members are multicolored having a foreground color and a background color, the background color being informative of the order in which the member is placed in a phrase or clause and the foreground color being informative that the word is serving a dual function.

16. The system of claim 4 wherein some members are multicolored having a foreground color and a background color, the background color being informative of the order in which the member is placed in a phrase or clause, and the foreground color being informative that the word is serving a dual function.

17. The system of claim 2 wherein the members are flat placards.

18. The system of claim 17 further comprising transparent pocket means into which the placards are inserted for keeping them in order.

19. The system of claim 18 further comprising a sheet with transparent pockets.

20. The system of claim 15 wherein members of the first set which are multicolored are relative pronouns, gerunds, infinitives in the nominative case, and infinitives in the objective case, and wherein members of the second set which are multicolored are participles, infinitives used as modifiers, subordinate conjunctions, and conjunctive adverbs.

* * * * *